Aug. 17, 1943.   H. J. MURPHY   2,327,329
FASTENER AND FASTENER INSTALLATION
Filed Nov. 19, 1940
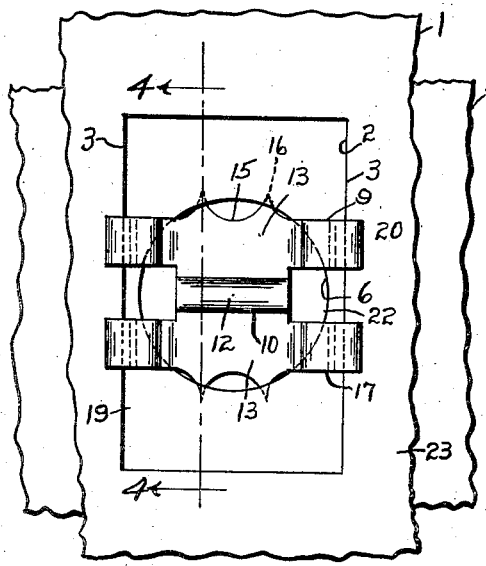
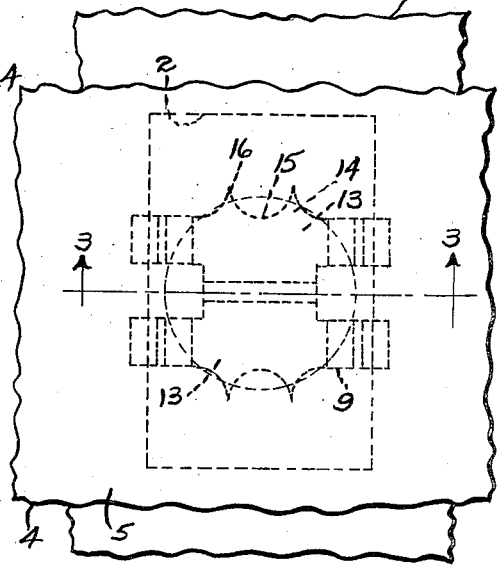
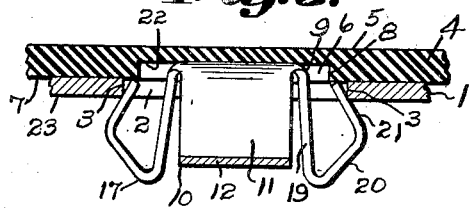
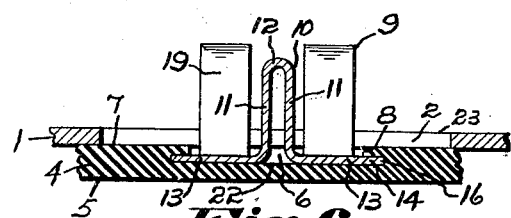
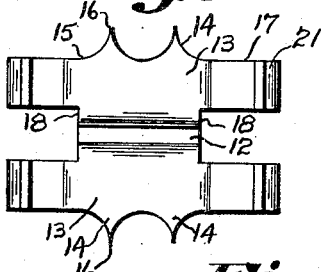
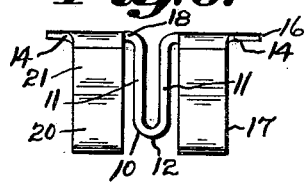
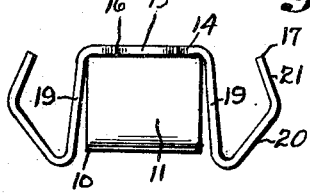
Inventor:
Howard J. Murphy.
By John Todd
Att'y.

Patented Aug. 17, 1943

2,327,329

UNITED STATES PATENT OFFICE 2,327,329

FASTENER AND FASTENER INSTALLATION

Howard J. Murphy, Greenwood, Mass., assignor to United-Carr Fastener Corporation, Cambridge, Mass., a corporation of Massachusetts Application November 19, 1940, Serial No. 366,257

8 Claims. (Cl. 189—88)

This invention relates to fasteners and fastener installations and is directed particularly to a fastener member for securing a strip of phrenolic condensate material such as Bakelite or the like to a supporting structure having an opening.

The chief object of my invention is directed to a fastener adapted for use in connection with an installation wherein it is desirable that the part to be supported, or strip, have an outside face which is completely smooth and unmarked so as to present no indication of the method by which it is secured to its support. In order to effect this result, a countersunk recess has been provided on the inner, or hidden, face of the strip and the fastener member is designed to provide attaching portions engaging the strip within the countersunk recess. Thus no portion of the fastener is visible on the exterior surface of the strip and the strip has a neat and attractive appearance on its visible side. The fastener member also provides support-engaging portions adapted to be extended through an opening of the support and engage behind the support in a way to draw the strip into tight fastened engagement with the support.

Other objects and uses of my invention will be apparent from inspection of the drawing and specification hereinbelow set forth.

Referring to the drawing, in which I have illustrated a preferred embodiment of my invention:

Fig. 1 is a bottom plan view of the fastener installation including a supporting part and a panel secured to the supporting part by means of my improved fastener member;

Fig. 2 is a top plan view of the installation shown in Fig. 1;

Fig. 3 is a section taken along the line 3—3 of Fig. 2;

Fig. 4 is a section taken along the line 4—4 of Fig. 1;

Fig. 5 is a top plan view of my improved fastener member per se;

Fig. 6 is an end view of the fastener shown in Fig. 5; and

Fig. 7 is a side view of the fastener member per se.

Referring to a preferred installation of my fastener member shown in Figs. 1-4, I have provided a supporting panel 1, which may be of metal, having an opening 2 therein shaped to provide spaced parallel sides 3—3. I do not wish to limit use of my fastener solely to this form of supporting panel, however, as it is equally adaptable to use with installations where an equivalent to the supporting panel illustrated is provided in the form of cooperating flanges having straight edges spaced throughout their entire lengths. Thus, for example, my fastener member may be used to secure a breaker strip between the inner and outer spaced walls of a refrigerator compartment. In such an installation the inner and outer walls of the compartment have inturned flanges adjacent the opening of the compartment to be sealed by a door and spaced for their entire lengths, and a strip of Bakelite or the like material is applied to the flanges and secured thereto so as to cover completely the space between the walls. The strip of Bakelite acts to break conductivity between the inner and outer walls of the refrigerator cabinet, as will be understood by those skilled in the art.

In my preferred installation, however, as shown in the drawing, I have chosen to illustrate the use of my fastener member in a simple trim installation wherein it is desired, as for purposes of ornamentation, to secure a trim strip to a support. The supported part which I have chosen for purposes of illustration is in the form of a relatively thin Bakelite strip 4 having a smooth flat exterior surface 5. A countersunk recess 6, which is preferably circular in shape, is formed in the inner surface 7 of the strip and is of a depth to extend substantially half way through the thickness of the strip, as most clearly shown in Figs. 3 and 4, so as to provide a wall 8 surrounding the recess. The strip 4 is secured to the support by means of a fastener member 9 having head sections engageable with the wall 8 of the strip within the recess 6 so as to secure the fastener member in assembly with the strip and support-engaging portions adapted to extend through the opening 2 of the support and engage behind material of the support adjacent the opening.

Referring in detail to my improved fastener member 9, I have shown one formed entirely from a single strip of spring metal. The strip of metal is folded between its ends to provide a loop portion 10 having spaced, straight, substantially parallel sides 11—11 joined at one end by a bight 12. A base in the form of head sections 13—13 integrally joined to the ends of the sides 11—11 away from the bight 12 extend outwardly in opposite directions in a single plane substantially normal to the planes of the legs 11—11. Each of the head sections 13 has a pair of attaching portions 14 integral with their edges 15 opposed to those joined to the respective sides 11—11 of the loop. The attaching portions 14 are disposed in the planes of the respective head sections and are in the form of laterally extending projections tapered to a relatively sharp point at their outermost ends 16. Each of the head sections 13, in my preferred form, has a pair of yieldable support-engaging portions or leg portions 17 which are joined to opposed side edges 18—18 (Fig. 5) of the head sections. Each of the support-engaging portions 17 has a straight portion 19 extending downwardly away from its respective head section, viewing Fig. 3, on the same side of the head section as the loop 10 and a return-bend portion at its outermost end comprising a camming portion 20 extending outwardly away from the straight portion 19 and a shoulder portion 21 extending inwardly toward the straight portion.

Assembly of the parts of the installation is carried out through first securing the fastener member 9 in assembly with the strip 4. This is accomplished by compressing the sides 11—11 of the loop 10 by a suitable tool (not shown) thereby moving the head sections 13—13 toward each other until the distance between the points 16 of opposed attaching portions 14—14 of the head sections is less than the diameter of the recess 6 of the trim strip. The head sections are now moved into the recess 6 so as to abut the bottom wall 22 of the recess. When the head sections are in this position, pressure upon the sides 11—11, tending to compress them, is released whereupon the sides expand toward normal position under the spring tension provided by the loop thereby causing the head sections to move laterally away from each other. As a result, the points 16 of the attaching portions embed themselves in the walls of the recess 6, as most clearly shown in Fig. 4. If the trim strip 4 should be formed of material so hard that it is impossible for the attaching portions to embed themselves therein solely by the force imparted by natural expansion of the sides of the loop, a supplementary force may be applied through means of a tool such as a screw driver inserted between the side portions 11—11 and operated in a way to mechanically spread the sides. The fastener member is now securely assembled with the trim strip 4 and the trim is ready for application to the supporting panel. This is accomplished by moving the trim toward the panel to extend the support-engaging portions into the aperture 2. During this action the camming portions 20 of the support-engaging portions engage the edges 3 of the panel so as to force the straight portions 19 of opposed support-engaging portions inwardly toward each other permitting the support-engaging portions to pass entirely through the aperture 3, after which the straight portions 19 expand to engage the shoulders 21 behind the inner surface 23 of the support, as most clearly shown in Fig. 3.

It will be noticed that the line of movement of opposed support-engaging portions 17 during the action in which they are snapped through the opening 2 of the supporting panel takes an opposite direction to the line of movement of the head sections 13 during assembly thereof with the trim strip. As a result, there is no tendency for the head sections to become disengaged from the trim strip when the fastener is snapped into engagement with the support. It is understood that I have illustrated one application only of my improved fastener member and that the fastener is adaptable to use in a variety of installations in which it is desired to secure one part to another.

Although I have illustrated and described a preferred embodiment of my invention, I do not wish to be limited thereby because the scope of my invention is best set forth in the following claims.

I claim:

1. A fastener member for securing a part to a support having an opening which comprises a pair of normally spaced head sections, each of which has an attaching element to be embedded in said part whereby said fastener is secured to said part, spring means engaging said head sections and acting to force said head sections outwardly to maintain said attaching elements in said embedded relation to said part, and spaced yieldable legs extending from said head sections and adapted to project through said support and engage behind the same to secure said parts together.

2. A fastener member for securing a part having a countersunk recess to a support having an opening which comprises a pair of normally spaced head sections disposed in the same plane, each of said head sections having a lateral projection pointed at its outermost end to be embedded in the walls of said part surrounding said recess whereby said fastener is secured thereto, spring means engaging said head sections and acting to force said head sections away from each other to maintain said projections in said embedded relation to said part, and spaced yieldable legs extending from said head sections and adapted to project through said support and engage behind the same to secure said parts together.

3. A fastener member for securing a part having a countersunk recess to a supporting panel, said fastener comprising head sections disposed in the same plane and joined by a loop, each of said head sections having a lateral projection disposed in the plane of said respective head section and pointed at its outermost end to embed itself in the walls of said part surrounding said recess, said loop acting as a spring forcing said head sections away from each other to maintain said projections in said embedded relation to said part, and yieldable legs integral with said head sections having means for snap fastener engagement with said support through said opening.

4. A fastener member for securing a part having a countersunk aperture to a support having an opening, said fastener being formed from a strip of metal bent between its ends to form a loop having opposed substantially parallel sides joined by a bight, a head section extending from the end of each of said sides away from said bight, said head sections extending outwardly away from each other and disposed in a plane substantially normal to that of said respective legs, each of said head sections having at least one projection extending laterally from an edge opposed to that joined to said respective side, said loop acting as a spring forcing said head sections away from each other to maintain said projections in said embedded relation to said part, and yieldable legs integral with said head sections having means for snap fastener engagement with said support through said opening.

5. A fastener member for securing a part having a countersunk aperture to a support having an opening, said fastener being formed from a strip of metal bent between its ends to form a loop having opposed substantially parallel sides joined by a bight, a head section extending from the end of each of said sides away from said bight, said head sections extending outwardly away from each other and disposed in a plane normal to that of said respective legs, each of said head sections having at least one projection extending laterally from an edge opposed to that joined to said respective side, said head sections being movable toward and away from each other under the tension of said loop, and a pair of opposed yieldable legs extending from each of said head sections having means for snap fastener engagement with said support through said opening, and the legs of each of said pairs being movable toward and away from each other in a line normal to the line of movement of said head sections.

6. A fastener installation comprising, in combination, a secured part having an opening surrounded by walls, a support having an opening and a fastener member securing said part to said support, said fastener having a pair of head sections joined by a loop portion, said head sections being embedded in the walls surrounding the opening of said part under the tension of said loop, and yieldable legs extending from said head sections on the same side thereof as said loop and in spaced relation to said loop, said legs being in fastener engagement with said support through said opening.

7. A fastener installation comprising, in combination, a part having an opening, a support having an opening and a fastener member securing said part to said support, said fastener having a pair of head sections joined by a loop portion, said head sections being movable laterally toward each other against the tension set up in said loop so as to be moved into said opening of said part and said head sections being movable away from each other under said tension to embed themselves in said part adjacent said opening, and yieldable legs extending from said head sections on the same side thereof as said loop and in spaced relation to said loop, said legs being in fastener engagement with said support through said opening.

8. A fastener installation comprising, in combination, a part having a countersunk recess, a support having an opening and a fastener member securing said part to said support, said fastener having a pair of head sections joined by a loop portion, each of said head sections having a pointed attaching portion integral with an edge thereof, said head sections being movable laterally toward each other against the tension set up in said loop so as to be moved into said recess and said head sections being movable away from each other under said tension to embed said attaching portions in the wall of said part surrounding said recess, and yieldable shouldered leg portions extending from said head sections on the same side thereof as said loop and in spaced relation to said loop, said legs being in snap fastener engagement with said support through said aperture.

HOWARD J. MURPHY.